United States Patent
Hohmann, Jr.

(10) Patent No.: US 7,874,121 B1
(45) Date of Patent: Jan. 25, 2011

(54) WEATHERPROOFING SYSTEM FOR WINDOW AND DOOR INSTALLATION

(75) Inventor: Ronald P. Hohmann, Jr., Hauppauge, NY (US)

(73) Assignee: Mitek Holdings, Inc., Wilmington, DE (US)

( * ) Notice: Subject to any disclaimer, the term of this patent is extended or adjusted under 35 U.S.C. 154(b) by 833 days.

(21) Appl. No.: 11/328,355

(22) Filed: Jan. 9, 2006

Related U.S. Application Data (63) Continuation-in-part of application No. 11/318,761, filed on Oct. 27, 2005, now Pat. No. 7,754,304.

(51) Int. Cl.
E04D 1/36 (2006.01)
E06B 1/04 (2006.01)
E04C 2/38 (2006.01)

(52) U.S. Cl. .......................... 52/717.01; 52/58; 52/62; 52/204.1

(58) Field of Classification Search ............. 52/204.1, 52/204.5, 211, 717.01, 58, 62, 97, 210, 212; 49/467, 471; 428/42.3, 192
See application file for complete search history.

(56) References Cited

U.S. PATENT DOCUMENTS

| | | | | |
|---|---|---|---|---|
| 3,497,417 A | * | 2/1970 | Rizzo | 428/608 |
| 4,204,373 A | * | 5/1980 | Davidson | 52/204.1 |
| 4,421,807 A | * | 12/1983 | Clausing et al. | 428/40.3 |
| 4,509,999 A | * | 4/1985 | Sandor | 156/71 |
| 5,106,447 A | | 4/1992 | Di Rado et al. | 156/334 |
| 5,137,777 A | * | 8/1992 | Silverman et al. | 428/316.6 |
| 5,268,228 A | * | 12/1993 | Orr | 428/343 |
| 5,377,464 A | | 1/1995 | Mott et al. | 52/213 |
| 6,244,001 B1 | | 6/2001 | Anastasi | 52/215 |
| 6,256,956 B1 | * | 7/2001 | Davis | 52/408 |
| 6,305,130 B1 | | 10/2001 | Ackerman, Jr. | 52/58 |
| 6,401,401 B1 | * | 6/2002 | Williams | 52/58 |
| 6,401,402 B1 | * | 6/2002 | Williams | 52/58 |
| 6,479,119 B1 | | 11/2002 | Simpson | 428/40.1 |

(Continued)

OTHER PUBLICATIONS

MFM Building Products Corp. *Weatherproofing and Sealing Systems; Technical Information*, 7pp. (Coshoston, Ohio:2009).

(Continued)

*Primary Examiner*—Richard E Chilcot, Jr.
*Assistant Examiner*—Ryan D Kwiecinski
(74) *Attorney, Agent, or Firm*—Siegmar Silber, Esq.

(57) ABSTRACT

A weatherproofing system for installing windows and doors is described and has a front seal and a real seal. The seals include clear, pressure-activated adhesives and seal against attaching hardware. The rear seal has a is self-setting foam web and molds to the flange of the window unit. When installed, the foam is compressed between the inner window frame and rough opening and between the window flange and the wall surface adjacent the rough opening. The system extends beyond the flange of the window unit and receives the weatherproofing membrane thereover. The weatherproofing system acts as a sealed bridge between the membrane and the window unit precluding entry of air and water. Both the foam and the adhesive have fire retardants in the formulation thereof. The rear seal is provided in a tape form with a self-skinned foam layer and a sheet form with polymeric covering web.

14 Claims, 5 Drawing Sheets

U.S. PATENT DOCUMENTS

| | | | | |
|---|---|---|---|---|
| 6,627,017 | B2 | 9/2003 | Simpson | 156/71 |
| 6,725,610 | B2* | 4/2004 | Murphy et al. | 52/58 |
| 6,848,220 | B2 | 2/2005 | Faurholdt et al. | 52/58 |
| 7,754,304 | B1* | 7/2010 | Hohmann, Jr. | 428/40.1 |
| 2002/0108326 | A1* | 8/2002 | Ackerman, Jr. | 52/204.5 |
| 2003/0177712 | A1* | 9/2003 | Gatherum | 52/60 |
| 2005/0011140 | A1* | 1/2005 | Ackerman et al. | 52/58 |
| 2005/0032447 | A1* | 2/2005 | Tachibana et al. | 442/149 |
| 2005/0106387 | A1* | 5/2005 | Ishikawa et al. | 428/354 |
| 2006/0101726 | A1* | 5/2006 | Collins | 52/58 |
| 2007/0175107 | A1* | 8/2007 | O'Rourke | 52/58 |
| 2010/0170186 | A1* | 7/2010 | Hohmann, Jr. | 52/741.4 |

OTHER PUBLICATIONS

York Manufacturing, Inc. *Jamflash® Spec Sheet*, 2 pp. (Sanford, ME; undated).

Tarco. *Online Catalogue entry for LeakBarrier Door and Window Tape*, 2 pp. (Little Rock, AR; Jun. 21, 2005).

Clark/Hammerbeam Corporation. *Aquaseal information sheet*. 2 pp. (Dedham, MA; undated).

Tamako Roofing Products, Inc. *Advertisement for Window and roof waterproofing products*. 1 pp. (Joplin, MO; 2004).

MFM Building Products Corp. "Window Wrap™". *Shelter Magazine* (Jun. 2005).

MFM Building Products Corp. *Data Sheet for Window Wrap™*, 2 pp. (Coshocton, OH; undated).

E.I. du Pont de Nemouns and Company, Inc. *Installation Guidelines for DuPont™ Flashing Systems™ with integral flanged windows AFTER weather-resistive barrier is installed*. 5 pp. (Wilmington, DE; 2004).

E.I. du Pont de Nemouns and Company, Inc. *Installation Guidelines for DuPont™ Flashing Systems™. . . BEFORE weather resistive barrier is installed*. 5 pp. (Wilmington, DE; 2004).

Protecto Wrap, Inc. *Newsrelease—Protecto Wrap BT20XL Tape*. 3 pp. (Denver, CO; undated).

Kelcom, Inc. *Protecta Wrap Spec*. 3 pp. (Ekhart, IN, undated).

Kelcom, Inc. *Instructions for Installation of Protecta Wrap*. 2 pp. (Ekhart, IN; undated).

Lennel Specialties Corporation. *Window Flashing System Installation Instructions for Punched Window Openings with Loose Steel Lintels*. 23 pp. (Stoughton, MA; undated).

Spier, John. "Not-So-Rough Openings: Framing exterior openings precisely will make installing the windows and doors a breeze." *Fine Homebuilding*. p. 56-59. Dec. 2005/Jan. 2006.

\* cited by examiner

WEATHERPROOFING SYSTEM FOR WINDOW AND DOOR INSTALLATION

CROSS-REFERENCE TO RELATED APPLICATION

This application is a Continuation-in-Part of application Ser. No. 11/318,761 now U.S. Pat. No. 7,754,304 entitled WEATHERPROOFING BACKER FOR WINDOW AND DOOR INSTALLATION filed Dec. 27, 2005 by Express Mail (Certificate ER 091040404 US) which is incorporated herein by reference.

BACKGROUND OF THE INVENTION

1. Field of the Invention

This invention relates to a weatherproofing system for window and door installation. The system includes two weatherproofing seals—a front seal and a rear seal. In a building structure, the seals are overlaid by a weatherproofing membrane and by a flange of a window or door unit so that the device bridges the two construction elements. More particularly, the rear seal provides a seal without the use of conventional flashings, caulking compounds, or insulation. As the material of the rear seal is self-setting and conforms to the geometry of the flange, the rear seal provides an expansion joint therefor. Two embodiments of the rear seal are shown, namely, a peel-and-stick product and a broad-tape product, both of which utilize advanced adhesive technology. The adhesives described are all clear pressure-activated adhesives and are compatible with the surfaces of the rough openings prepared for installation of the window and door units and with the weatherproofing membrane.

2. Description of the Prior Art

In the past, window flashing constructions have been complicated devices requiring many installation steps including fastening with self-tapping screws, applying adhesives, installing air/vapor barriers, filling the joint between the window frame and rough opening with insulation, and applying additional beads of caulking and tape over the window flanges. Even with great care consistent waterproofing has been elusive, and additionally air/water vapor barriers have failed. With time caulking has deteriorated and lost integrity, insulation has shifted and been dislodged, and thermal expansion and contraction has formed channels permitting water to seep into interiors.

Moisture penetration in and around windows and doors has been the cause of damage to metal and wooden studs, sheathing, and interior wallboard and finishes thereof. In response to such problems, numerous approaches have been proposed. A selection of marketed and/or patented devices purporting to obviate the above-stated concerns are reviewed in the following paragraphs describing the prior art.

A common approach to flanged window installation is the use of window sealing tape which is applied on the sill and overlapped with vertical strips on the jambs. The tape is recommended for use with a continuous bead of sealant or caulking on the installed strips and along the header. The bead of sealant or caulking is disposed so as to correspond with the flanged portion of the window assembly and, upon insertion of the window assembly, the bead is compressed. Thereafter, the window sealing tape is applied atop the header flange with an additional bead of sealant or caulking. This also overlaps the right and left jamb tapes. Optionally, tape is applied on the exterior of the flanges with additional beads of sealant and caulking and thereby substantially enveloping the flanges of the window assembly.

Subsequent to this development, Ackerman provided a window flashing in U.S. Pat. No. 6,305,130 wherein an L-shaped flashing was formed with a raised water dam. The legs of the flashing with the raised water dam fits within the interior perimeter of the window-receiving rough opening and is attached thereto. Integral with the L-shaped flashing is an outer flap that is designed to surround the flange of the window unit being installed. The outer flap has a weather strip positioned thereon behind the window flange. In a later patent application, namely, Ackerman et al., Patent Application Publication US 2005/0011140, a continuation-in-part of the above-cited patent, the use of a foam wedge as an under flange seal is shown.

Building on the 1990's state-of-the-art, Anastasi obtained a patent, U.S. Pat. No. 6,244,001, for a system of installing windows and doors in cavity walls. Here, a 40-mil thick extrusion having three vanes joined at a common edge is used. While the specific material is not delineated, it is suggested that the flashing is formed as a unitary piece from semirigid polypropylene. A drywall backup wall or inner wythe is shown with one vane or leg of the extrusion to be attached to the exterior face thereof corresponding with the edge of the rough opening and another leg attached to the inside face of the rough opening. The remaining vane is draped against the window frame and is held thereagainst by a sealant system comprised of a backer rod and caulking.

The after-flashing activity of window installation includes many steps, the omission of any one of which could effect the weatherproofing integrity. Among these activities are such steps as trimming excess flashing, installing a backer rod around the window perimeter, caulking around the perimeter atop the backer rod, filling the joint between the window frame and the rough opening jambs with loose insulation, filling the joint between the window frame and the rough opening sill with insulation, filling the joint between the window frame and the header, forming a sill flashing pan by turning the drip edge of the flashing membrane up against the window frame and installing the interior sealant bead along the jambs and the header. Complicating the technician's job by adding a large number of after-flashing installation steps leads inevitably to human error and consequently to incomplete work. Technical simplification becomes a curative element to such a morass.

In a different area of building construction, the inventor hereof teaches in a co-pending application about the use of polymeric foam backer materials for expansion joints. There testing revealed that some below-standard polymeric foam backer materials outgas upon exposure to certain environmental conditions and release undesirable remnant blowing gases. This deficiency was overcome by replacing substantially all of the remnant blowing gases with ambient air while maintaining the closed cell structure of the foam.

A prior art ASTM Standard suggested that such gaseous releases potentially compromise the intended performance of the backer material. However, elimination of outgassing has therefore necessarily preceded the use of the foam materials discussed hereinbelow so as to suit the foam materials for the specific building construction applications hereof. Particularly, the foam materials used herein are compatible with the weatherproofing membranes.

In the course of preparing this disclosure several patents became known to the inventors hereof. The following patents are believed to be relevant and are discussed further as to the significance thereof:

| Item | U.S. Pat. No. | Inventor | Assignee | Issued/ U.S. Cl. |
|---|---|---|---|---|
| 1. | 6,479,119 (method claims only) | Simpson, R. S | MFM Bldg Products Corp Coshocton, Ohio | Nov. 12, 2002 428/40.1 |
| 2. | 6,627,017 | Simpson, R. S. | MFM Bldg Products Corp Coshocton, Ohio | Sep. 30, 2003 156/71 |
| 3. | 6,244,001 (cls. read on accessory unit-door/window) | Anastasi, L. L. | York MFG | Jun. 12, 2001 52/215 |
| 4. | 6,305,130 | Ackerman Jr., D. S. | | Oct. 23, 2001 52/58 |
| 5. | 5,377,464 | Mott et al. | Owens-Corning Summit, Illinois | Jan. 3, 1995 52/213 |
| 6. | 6,725,610 | Murphy et al. | Exterior Research, LLC | Apr. 27, 2004 52/58 |

| Item | Published application Ser. No. | Inventor | Pub. Date / U.S. Cl. |
|---|---|---|---|
| 7. | 2005/00111140 | Ackerman Jr., D. S. et al. | Jan. 20, 2005 52/58 |

Further, in the past manufacturers of window flashings sought to provide specifically configured fittings for corners, sills, headers and jambs. Consequently, certain flashing parts are specified for use with particular field-applied caulks and sealants, weatherstripping, adhesives, and insulation. Such specificity of product application leads to storage, order fulfillment, and quality control problems. It is readily seen that the provision of a more universal weatherproofing backer as described hereinbelow resolves such problems and avoids technical considerations of selecting the specific flashing and associated installation accessories for the application.

In recent years, the federal government has encouraged innovation in building materials by providing builders and manufacturers of energy-efficient homes with tax credits. The credit is available for qualifying residential structures that meet certain criteria. Using the appropriate weatherproofing materials, materials which improve the heat retention characteristic of the overall residential structure, enables the builders and manufacturers to more readily qualify for the tax credit.

The submission of the above discussion of documents is not intended as an admission that any such document constitutes prior art against the claims of the present application. Applicant does not waive any right to take any action that would be appropriate to antedate or otherwise remove any listed document as a competent reference against the claims of the present application.

SUMMARY

In general terms the weatherproofing system of this invention is for use in window and door installation. Insofar as the front and rear seals hereof simplifies present practices, the introduction at this time is understandable by viewing the developments in foam technology and in adhesives technology. The foam sheet material is compressible, self-setting, and degassed and the adhesives are preferably clear, pressure-activated hot melts with high tack U-V resistant and fire retardant characteristics.

The weatherproofing system hereof is provided in two embodiments, namely, a two-tape seal embodiment and a peel-and-stick embodiment using a rear seal sheet with a front seal tape. The rear seal tape of the first embodiment is a foam web with a high-tack adhesive, preferably a pressure-activated hot melt clear adhesive. Strips of the rear seal tape are applied in an abutting relationship to the sill, the jambs, and the header of the rough opening provided for the window unit. A lining portion of each strip covers the interior surface of the rough opening providing a compressible lining for receiving a window unit. When the window unit is mounted, the lining fits securely against the inner frame of the window and seals thereagainst in a slip-fit relationship.

After lining the rough opening, the strips of the rear seal tape are then folded back upon the exterior surface of the wall surrounding the rough opening. In so doing, the foam web of the rear seal provides an external radius or throat that facilitates the mounting of the window unit. A portion of this tape seals to the underside of the flange of the window and the rest extends peripherally beyond the flange so as to provide a connection site for the weatherproofing membrane. The window unit is installed in a manner wherein the flange seal portion is compressed with the facial plane thereof is intermediate that is intermediate that of the wall surface and that of the outer peripheral foam portion.

With the rear seal in place, the front seal for receiving the weatherproofing membrane is installed on top of the outer peripheral rear seal portion so that the front and rear seals bridge the window unit and the weatherproofing membrane. The bridge obviates the need for additional caulking and insulation. The foam bridge seals between the rough opening and the inner frame of the window unit, seals between the flange and the wall surface, and connects to the weatherproofing membrane. The flange is pressed into the foam which, being self-setting, molds to the shape of the flange and acts in addition as a thermal expansion joint. The rear seal tape is provided either with or without a release sheet and the front seal tape is provided with a release sheet. When a release sheet is not used, a self-skinned foam layer is provided which enables the tape form to be reeled.

In sheet form, the rear seal is applied to the surface of the wall so that the sheet extends beyond the flange-covered area. The weatherproofing backer is cut to so that the portion over the rough opening can be turned inward to line the interior of the rough opening. The rear seal is dimensioned so that the lined opening seals against the inner frame of the window unit.

Both the foam web material and the pressure-activated adhesive layer have additives enabling the materials to meet strict fire retardant features. As noted in the above Background of the Invention all blowing gases have been removed from the foam using methods previously described by the Applicant.

OBJECTS AND FEATURES OF THE INVENTION

It is an object of the present invention to provide a weatherproofing arrangement of front and rear seals which is economical to manufacture and is readily and simply installed.

It is another object of the present invention is to provide a rear seal of a polymeric foam material which, upon installation, is self-setting and molds to the surface of the window unit being installed.

It is a further object of the present invention to provide a rear seal constructed from a polymeric foam material that meets outgassing standards and conforms to and exceeds temperature range parameters.

It is a yet further object of the invention to provide a rear seal with compressibility and recovery characteristics that compensates for differentials in expansion contraction between building substrates and window structures over the entire temperature range of −70° F. to +180° F., thereby suiting it for use in climatic extremes.

It is a feature of the present invention that the adhesive layers thereof are clear, pressure-activated adhesives and bond to the rough surface of the building substrate extending into the interstices thereof and forming a strong mechanical bond therewith.

It is another feature of the present invention that, upon being compressively installed between the building substrate and the window structure, the rear seal is self-setting and molds to the intervening region, which is sealed making the region impervious to air and water flow therethrough.

It is yet another feature of the present invention that the front and rear seals hereof are resistant to ultraviolet radiation and do not deteriorate upon extended exposure thereto.

It is still yet another feature of the present invention that the foam webs hereof are formed from a doubly extruded foam wherein all blowing gases have been replaced by air and the foam is free of outgassing.

Other objects and features of the present invention will become apparent upon reviewing the drawing and reading together therewith the description which follows.

BRIEF DESCRIPTION OF THE DRAWINGS

In the following drawing, the same part in various views are afforded the same reference designators.

DESCRIPTION OF THE PREFERRED EMBODIMENTS

This invention discloses a weatherproofing system having a front and rear seal for emplacement within a rough opening for a flanged window unit and emplacement upon the exterior wall surface adjacent the rough opening. The rear seal of the weatherproofing system is formed from a polymeric foam—typically polyethylene foam, urethane foam, and neoprene foam—and compressively seals between the inner frame of the window unit and the lined interior of the rough opening and between the flange of the window unit and the exterior wall surface of the rough opening. After the application of the front seal, the weatherproofing system is overlaid by the weatherproofing membrane or building wrap and with the seals installed, the system bridges between the window unit and the weatherproofing membrane. Although the aforementioned polymeric foams are most common other foamed material, such as rebonded-rubber foam may also be used. The foams of this invention are of service over the entire temperature range from −70° F. to 180° F.; thus, suiting the weatherproofing system material to all climatic conditions.

Before proceeding with further details of the specification, several definitions are provided to aid in the understanding of the device. Here, wherever possible usage as close to the common understanding of the terms is adopted; however, as several specialized terms are used, a definition is adopted thereof which is clear, deliberate and precise.

For the purpose hereof, a self-setting foam is defined as a cellular structure consisting of both open and closed cells, most frequently polymeric in formation, and selected from such products to be moldable to the window unit being installed. Further, the self-setting characteristic is designed into the product by controlling the parameters of the compression set and recovery rates of the foam to be within certain predetermined ranges.

The rear seal has as a primary structural component thereof a polymeric foam. A polymeric foam is defined as a thermoplastic material that, after being subjected to a foaming or blowing agent, produces a cellular structure.

The rear seal (in tape form) is comprised of a cellular body portion and a skin portion. The cellular body portion may be open-cell, closed-cell, or a mixture of open and closed cell. A skin portion is defined as a self-skinned outer portion of the foam that has a surface precluding transfer of the pressure-activated adhesive. This enables the tape form of the rear seal to be rolled without the aid of a release sheet.

In use, the rear seal is compressed between the rough opening in a building and a window unit, such as a window unit with an integral flange. The weatherproofed cavity is defined as the opening formed by the facing surfaces of the structural components—the rough opening and the flanged window unit—and the seal-receiving region on the wall surface surrounding the flanged window unit.

Figure 1:
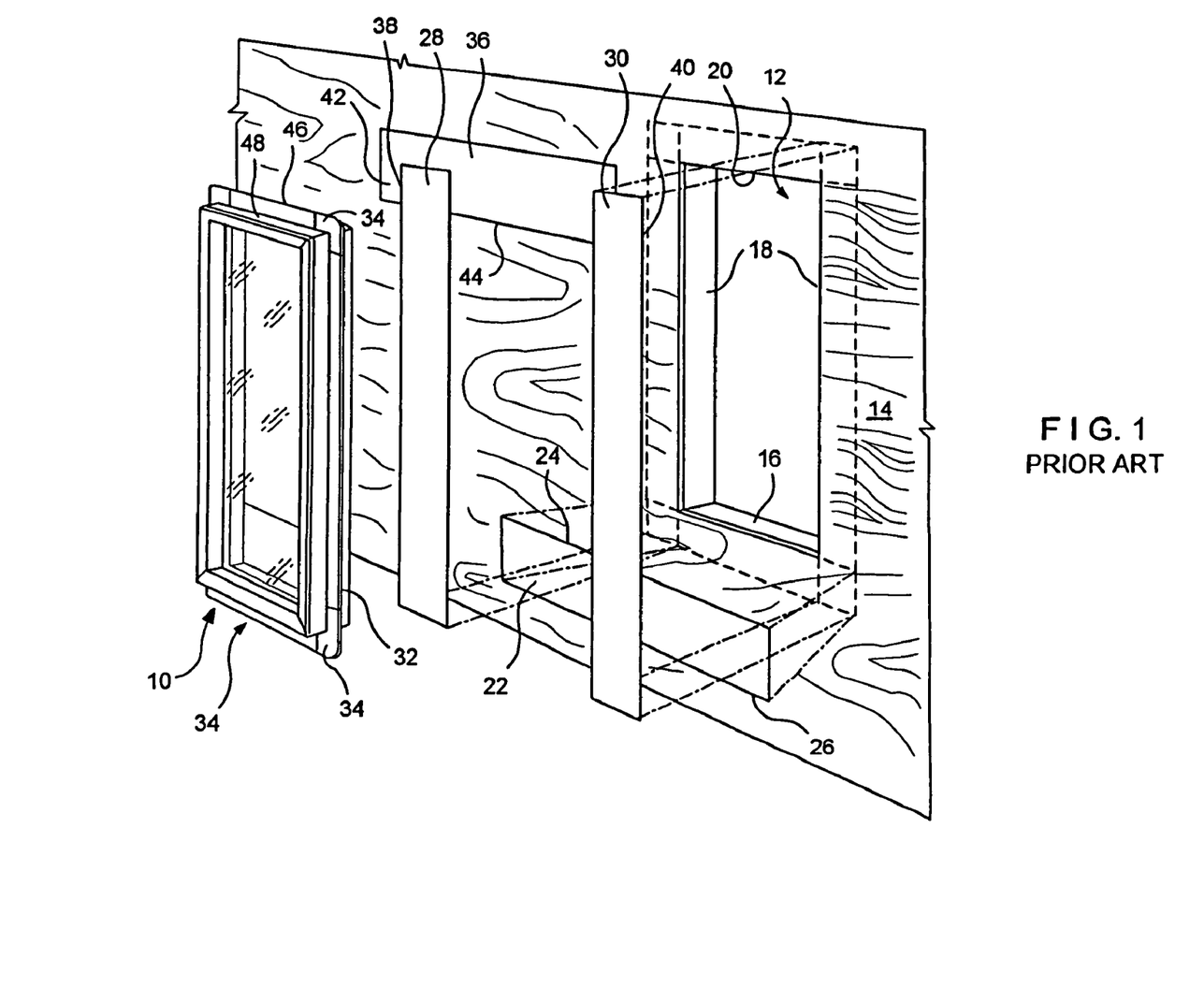
FIG. 1 is a perspective view of a prior art window flashing and installation thereof.

Referring now to FIG. 1, a typical prior art window flashing installation for an integral flanged window unit 10 is shown. This follows an American Architectural Manufacturers Association guideline. A rough opening 12 is sized to accept the window unit 10, which opening 12 is constructed with a fascia or substrate 14 backed by a sill 16, jambs 18, and header 20. A sill flashing 22 is mechanically fastened along the upper edge 24 thereof and is flush with the top edge of the sill 16. The lower edge 26 of the sill flashing 22 remains free so that a weather resistive barrier (not shown) can be applied thereunder.

The procedure is repeated with the jamb flashings 28 and 30. A continuous bead 32 of caulking or sealant is applied under window flange 34 and the window unit 10 is emplaced. A header flashing 36, which extends beyond the outer edges 38 and 40 of joint flashings 28 and 30, is mechanically attached at the upper edge 42 thereof so that the lower edge 44 covers head mounting flange 46. Another bead 48 of caulking or sealant is applied to the exterior surface of head mounting flange 46.

While the above paragraphs describe existing practices, numerous variations on the theme have been devised. Frequently additional steps are added to the procedure to incorporate installation of an air barrier, the insertion of loose insulation into the interior gap between the rough opening and the window unit, extra tape on the outside of the mounting flange, and plastic wraps for enveloping the mounting flange.

Referring now to FIGS. 2 through 6 a weatherproofing system is shown and is generally referred to by the reference designator 50. The system 50 has two primary components, namely, a front and a rear seal. The rear seal 51 has a foam face 52 and a pressure-activated adhesive layer 54—and several ancillary components described in the second embodiment. The foam facing or body 52 is cellular in structure and may contain open cells, closed cells or a mixture of open and closed cells. While almost any polymeric foam, usually a non-crosslinked foam is employed, a foam may be selected from urethane foam, neoprene foam and polyethylene foam. The adhesive layer 54 seals about attaching hardware (not shown) passing therethrough. Additionally and optionally, a foam utilizing rebonded rubber may be employed.

Figure 2:
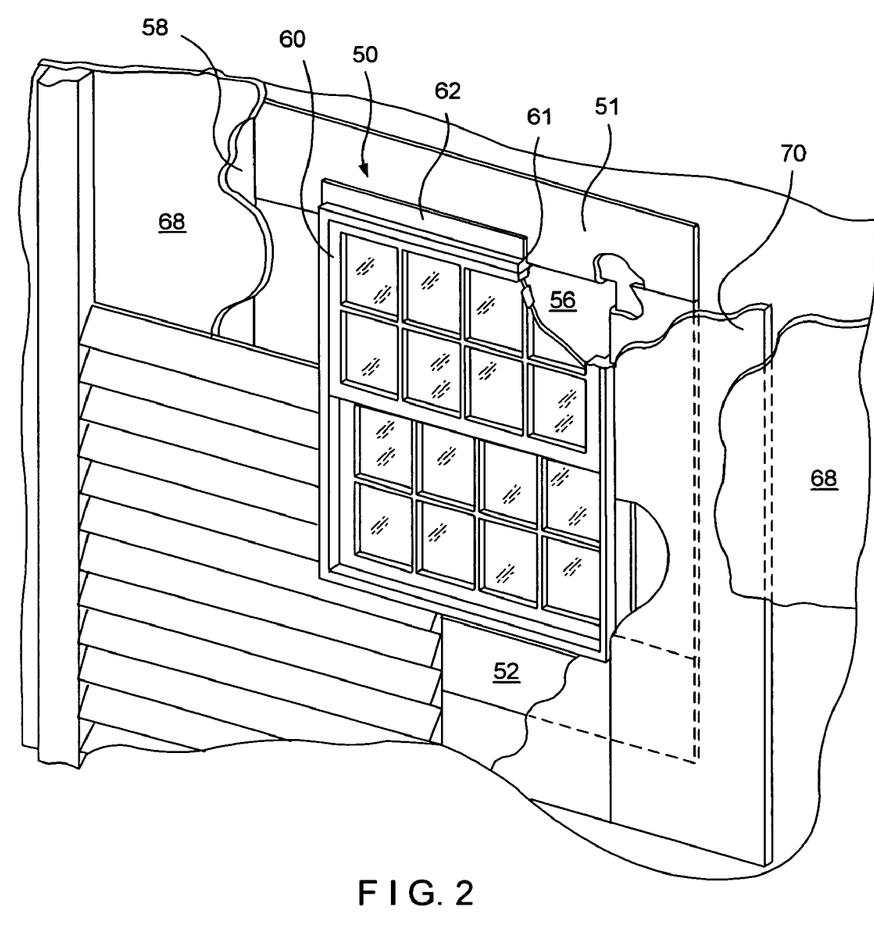
FIG. 2 is a perspective view of the weatherproofing system of this invention shown with structural elements partially broken away.

In FIG. 2, the weatherproofing system 50 is shown as installed with portions of the siding, weatherproofing membrane, and window unit broken away to reveal the tape form. The rear seal 51 is constructed for disposition as a liner within the rough opening 56 and is adhered to the building fascia or substrate 58 beneath the window unit 60 and extending therebeyond. The window unit 60 is constructed with an inner frame 61 and integral flange 62. With the flange 62 secured by attaching hardware to the wall surface or substrate 58 adjacent the rough opening 56 with the rear seal 51 disposed as shown, the foam is compressed 20 to 80%. The foam molds to the weatherproofed cavity (as defined hereinabove) and seals the region from penetration by water, air, and water vapor. With the structure described, no additional insulation needs to be added to the window unit and no caulking is required.

Figures 3, 4, 7:
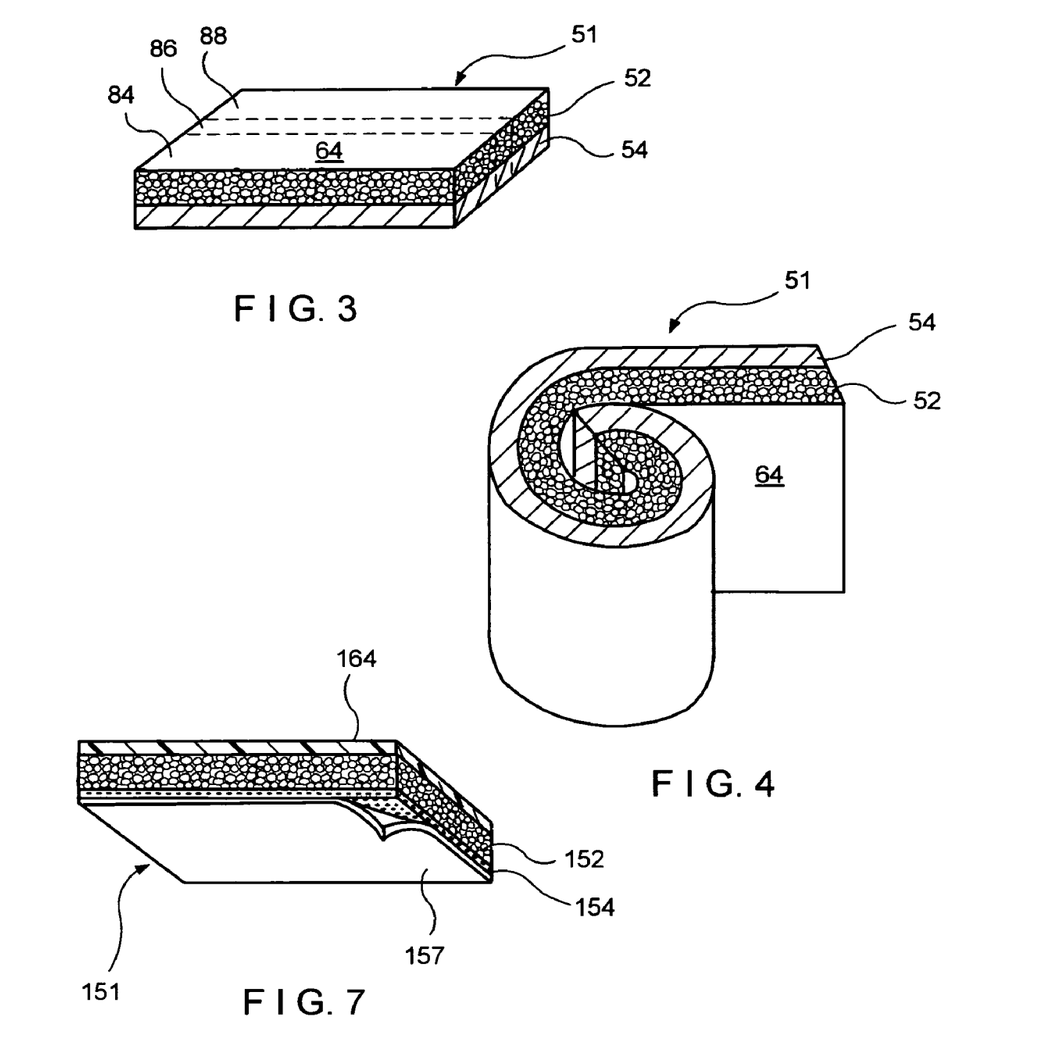
FIG. 3 is a cross-sectional view of the rear seal of the weatherproofing system of FIG. 2.
FIG. 4 is a perspective view of the rear seal in the tape roll form of FIG. 3.
FIG. 7 is a second embodiment of the weatherproofing backer having a laminated film atop the foam and a release sheet on the adhesive layer.

Referring now particularly to FIGS. 3 and 4 other aspects of the rear seal 51 are discussed. In this embodiment, the foam face 52 has disposed on one of the two major surfaces thereof adhesive layer 54; and, on the other, a self-skinned layer 64, which layer does not bond to the adhesive and acts in lieu of a release sheet. This enables the backer 50 to be rolled and unrolled without the adhesive layer 54 transferring onto the self-skinned layer 64.

Referring again to FIG. 2, the rear seal 51 further includes a hot melt adhesive layer 54 which is substantially transparent to nominally translucent material when cured. Besides the aesthetically desirable clear adhesive quality, the adhesive layer 54 is formulated for pressure activation and compatibility with the weatherproofing membranes 68. Optionally, a release sheet, see infra, is adhered thereto. The adhesives described herein are particularly useful for tape and peel-and-stick applications in building construction industry. The adhesives are readily pressure activated after removal from the tape roll or after the release paper is removed. The adhesive is formulated so that, in case of fire, the coatings thereof will not contribute to smoke or accelerate flame spreading and thus do not require inorganic fillers which have at times interfered with the adhesive function. Also, the adhesives are formulated to have sufficient tackiness so that a durable bond between the rear seal 51 and the rough and/or porous surface of the substrate 58 is experienced. The compressibility of the foam provides sealing upon abutting widths of the rear seal without the use of caulks and sealants at the joints thereof. Further details of the adhesives are provided below after the discussion of the front seal.

Figure 5:
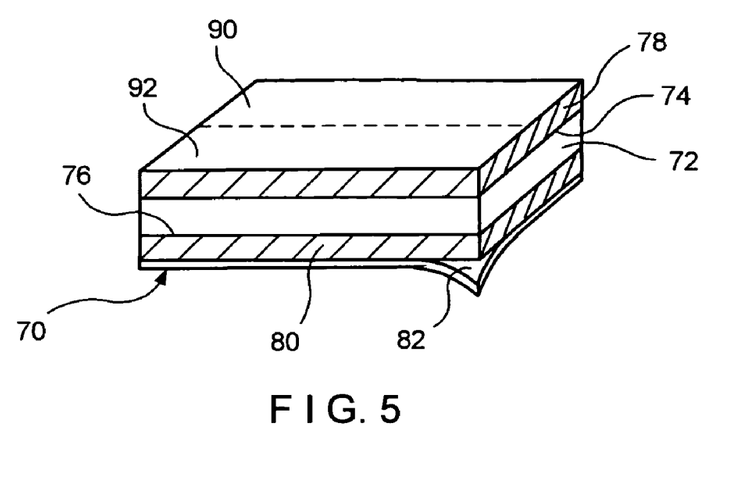
FIG. 5 is a cross-sectional view of the front seal of the weatherproofing system of FIG. 2.
Figure 6:
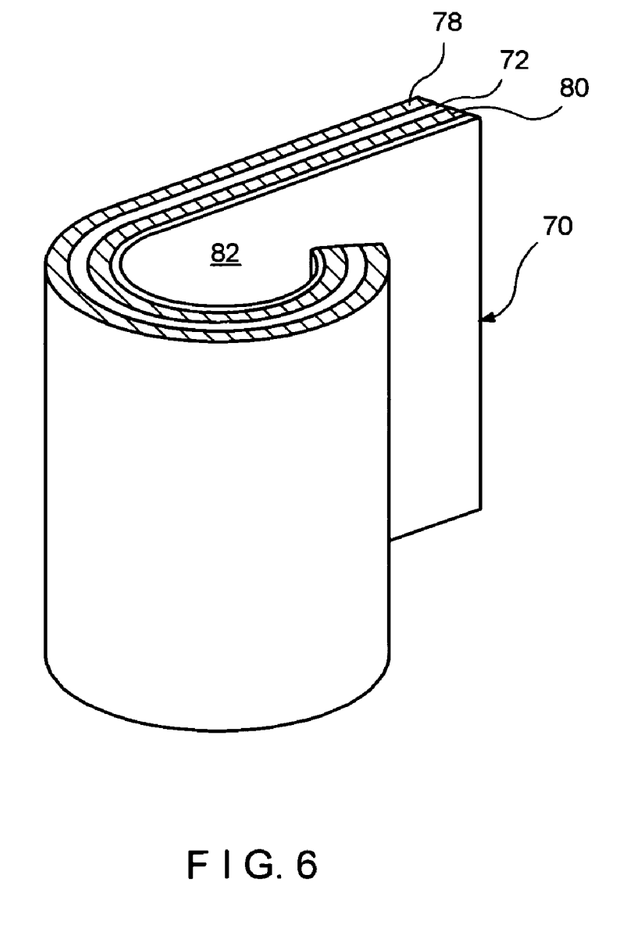
FIG. 6 is a perspective view of the front seal in the tape roll form of FIG. 5.

Referring now particularly to FIGS. 5 and 6, the front seal 70 of the weatherproofing system 51 is now discussed. The front seal 70 is a sheet—or web-like body 72 which may be constructed from a foam web, a polymeric tape, rebonded rubber, or a metal foil. While a metal foil web 72 is used herein, the use thereof is, by way of example, as any of the other materials could be suitable for the application at hand. The material selection being governed by compatibility with the building wrap (weatherproofing membrane) and with the window unit and by aesthetic and economic considerations.

The front seal 70 having a sheet-like body 72 has two major surfaces, denominated for purposes of discussion as rear surface 74 and front surface 76. Each surface has disposed thereon an adhesive layer. On surface 74, a clear, pressure-activated rear adhesive layer 78 is disposed and is, upon installation, in a cooperative functional relationship with the optional self-skinned layer 64 of rear seal 51 and is adapted to durably adhere, upon pressure activation to wall surface or substrate 58. As will be clear from the discussion which follows this rear adhesive layer 78 is selected for appropriate tackiness for the substrate surface 58.

The front seal 70 further is constructed with a front adhesive layer 80 disposed on surface 76 having a release sheet 82 thereover. The front adhesive layer 80 is a clear, pressure-activated adhesive. Upon installation thereof, the release sheet 82 is removed and the weatherproofing membrane 68 is durably adhered thereto by pressure activation. This adhesive layer 80, while similar to adhesive layer 78 may differ therefrom insofar as the service requirement is governed by compatibility with the weatherproofing membrane 68 and the tackiness required thereby.

As described above, the construction elements of the rough opening 56 in the wall surface or substrate 58 and the window unit 60 together define the weatherproofed cavity 66. These construction elements have, depending on the materials of construction, different rates of thermal expansion and contraction. With prior art flashing systems discussed above such differentials contribute to water and air penetration. Foam under compression, when selected with predetermined recovery characteristics overcomes such deficits. It has been found that foam having a recovery set in the 20 to 80 percent range at 18 psi fulfills this requirement.

Frequently at construction sites delays are experienced exposing building materials to ultraviolet (UV) radiation for long periods of time. Thus, it has been customary to rate such products for 120 days or 180 days of UV exposure. With the foam and adhesive construct hereof, no deterioration has been experienced upon exposure to UV radiation.

The front and rear seals 70 and 51, respectively, are each constructed with three functional segments. The rear seal 51 has a rough opening liner portion 84 is constructed to adhere to the interior of the rough opening 56 sealing against the inner frame 61; a flange-sealing or under-flange seal portion 86 is constructed to adhere to the wall surface 58; and, extending beyond the perimeter of window flange 62, a weatherproofing-membrane backer portion 88 is constructed to adhere to wall surface 58 and to receive atop thereof weatherproofing membrane 68. The rear surface 74 of the front seal 70 has a flange-sealing or over-flange seal portion 90 and extending beyond the perimeter of the rear seal 51, a substrate-seal portion 92. The front surface 76 of the front seal 70 functions as a seal for the weatherproofing membrane 68. Thus, weatherproofing system 50 hereof has a seven-point seal, to wit: (1) rear-seal-to-inner frame; (2) rear-seal-to-under-flange; (3) rear-seal-to-substrate; (4) front-seal-to-over-flange; (5) front-seal-to-substrate; (6) front-seal-to-rear-seal and, (7) front-seal-to-weatherproofing-membrane. Besides the superior sealing arrangement just described in contrast to the application-specific flashings presently in the marketplace, the foam of the rear seal of the weatherproofing system of this invention provides temperature stability over the entire −70° F. to 180° F. range. Thus, the seal integrity precluding penetration of water and air is maintained at both ends of the ambient temperature range rendering the present invention applicable under all climatic conditions.

Returning now to the description of the adhesives employed and incorporating by reference the Di Rado et al. patent, U.S. Pat. No. 5,106,447, the clear, hot melt adhesives are discussed. The compositions of hot melt layers 54, 78 and 80 may be prepared from 10 to 50 weight percent of an isotactic thermoplastic polybutene-1/ethylene copolymer containing from about 5.5 to about 10% by weight ethylene (polybutylene); 20 to 50 percent of a tackifier; 15 to 50 percent of an amorphous diluent having a softening point greater than 90 degrees C.; 0 to 2 percent of a stabilizer; and 0 to 5 percent wax.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of melt index, the applicable isotactic polybutylenes to be used in the present adhesive should exhibit a melt index in the range of from about 5 to 2000 dg/min and preferably from 400 to 700 dg/min. The latter melt flow values are determined by the method described in ASTM D1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins having a softening point, as determined by an ASTM method E28-58 T, of from about 80 degrees C. to 150 degrees C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-10, S-25, S-40, S-85, S-100, S-115, S-125 and S-135 resins as sold by Hercules Chemical; (3) aliphatic petroleum hydrocarbon resins having a Ball and Ring softening point of from about 80 degrees C. to 160 degrees C., resulting from polymerization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation; and (4) partially and fully hydrogenated hydrocarbon resins such as Resin H-130 from Eastman, Escorez 5000 series from Exxon, and Regalrez from Hercules. The amorphous diluents which are needed and present in the adhesive composition include (atactic) amorphous polypropylene or other similar high softening point (i.e. greater than 90 degrees C.), low crystalline diluent, (e.g. amorphous polyalpha-olefins). These diluents, are used at levels of 20 to 50% by weight, preferably about 20 to 25% by weight.

To test the degree of tackiness of the above-described weatherproofing system structure, a pull test is performed. An 8-inch by 12-inch sample is coated with a hot melt adhesive, namely, APC #915, manufactured by Adhesive Products Company, Indianapolis, Ind. 46235 which hot melt adhesive formulation includes one or more of the aforementioned tackifying resins. A suitable release paper is applied thereover. After a prescribed cure period, the release paper is removed and the backer of this invention is applied to the surface of a wood block. The application to the block is at room temperature utilizing a hand-operated laminating roller to provide the pressure activation. A spring scale is then backer from the block. Repeating the test for SBS-modified, peel-and-stick flashing, a force of 27 lb. (max.) is required to peel the flashing from the block.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; penta-erythrityl tetrakis-3 (3,5-di-tert-butyl-4-hydroxyphenyl) propionate; 4,4'methylenbis(2, 6-tert-butyl-phenol); 4,4'-thiobis (6-tert-butyl-o-cresol); 2,6-di-tertbutylphenol; 6-(4-hydroxy-phenoxy)-2,4-bis(octylthio)-1,3,5-triazine; di-n-octadecyl 3, 5-di-tert-butyl-4-hydroxy-benzylphosphonate; 2-(n-octylthio)-ethyl 3,5-di-tert-butyl-4-hydroxybenzoate; and sorbitol hexa [3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.00. It is also possible to add minor amounts (i.e. less than about 5% by weight of the formulation) of other diluents such as (1) waxes including petroleum waxes such as a paraffin wax having a melting point of from about 50 degrees C. to 75 degrees C. and microcrystalline wax having a melting point of from about 60 degrees to 90 degrees C.; the latter melting points being determined by ASTM method D127-60; (2) low molecular weight (600 to 3000) liquid polybutene; (3) polyethylene greases having a softening point of from about 80 degrees C. to 100 degrees C. and a hardness value, as determined by ASTM method D-1321, of from about 60 degrees C. to 120 degrees C.; (4) hydrogenated animal, fish and vegetable fats and oil such as hydrogenated tallow, lard, soya oil, cottonseed oil, castor oil, menhaden oil and cod liver oil; and (5) synthetic waxes made by polymerizing carbon monoxide and hydrogen, such as Fischer-Tropsch wax.

In addition, relatively small amounts (less than about 5%) of isotactic polypropylene may be employed as a reinforcing agent. Other additives such as flow modifiers, fire retardants, pigments, dyestuffs, etc., which are conventionally added to hot melt adhesives for various end uses may also be incorporated in minor amounts into the formulations of the present invention. The fire retardants added preclude flash ignition and meet the requirements of FAR 25.853B.

Figure 8:
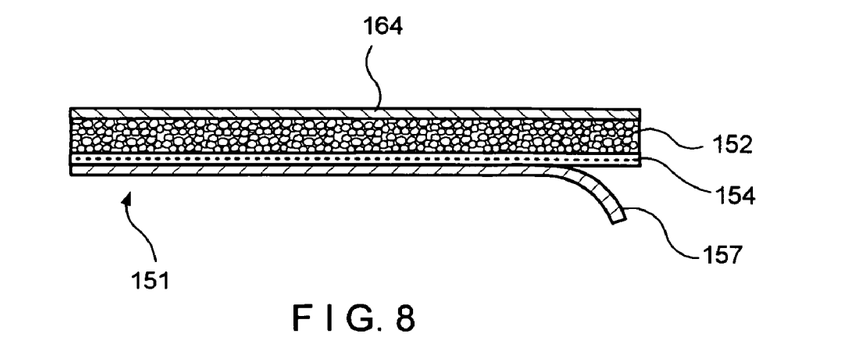
FIG. 8 is a cross-sectional view of FIG. 7.

The description which follows is of a second embodiment of the weatherproofing backer of this invention. For ease of comprehension, where similar parts are used reference designators "100" units higher are employed. Thus, the adhesive layer 154 of the second embodiment is analogous to the adhesive layer 54 of the first embodiment. Referring now to FIGS. 7 and 8, the second embodiment of the weatherproofing backer of this invention is shown and is referred to generally by the numeral 150.

In FIGS. 7 and 8, the sheet form of the rear seal 151 of weatherproofing system 150 the rear seal 151 is constructed to be mounted on the wall surface so as to extend beyond the window flange in all directions and to cover the rough opening. As described hereinbelow, the construct is designed to be cut and flaps formed from the portion covering the rough opening turned inward to line the interior of the rough opening. In the sheet form, the rear seal 151 comprises a foam body 152 and an adhesive layer 154. As in the first embodiment, the adhesive layer 154 seals about attaching hardware. Prior to application, release sheet 157 which is disposed on adhesive layer 154 is removed.

In contrast to the first embodiment, the second embodiment has a lamina or polymeric layer 164 disposed thereon which acts in a cooperative functional relationship with the weatherproofing membrane or wrap. This layer 164 may be a plastic film, a non-woven or woven scrim, or a composite thereof. The relationship between the rear seal 151 and the front seal is identical to that of the rear seal 51.

Figure 9:
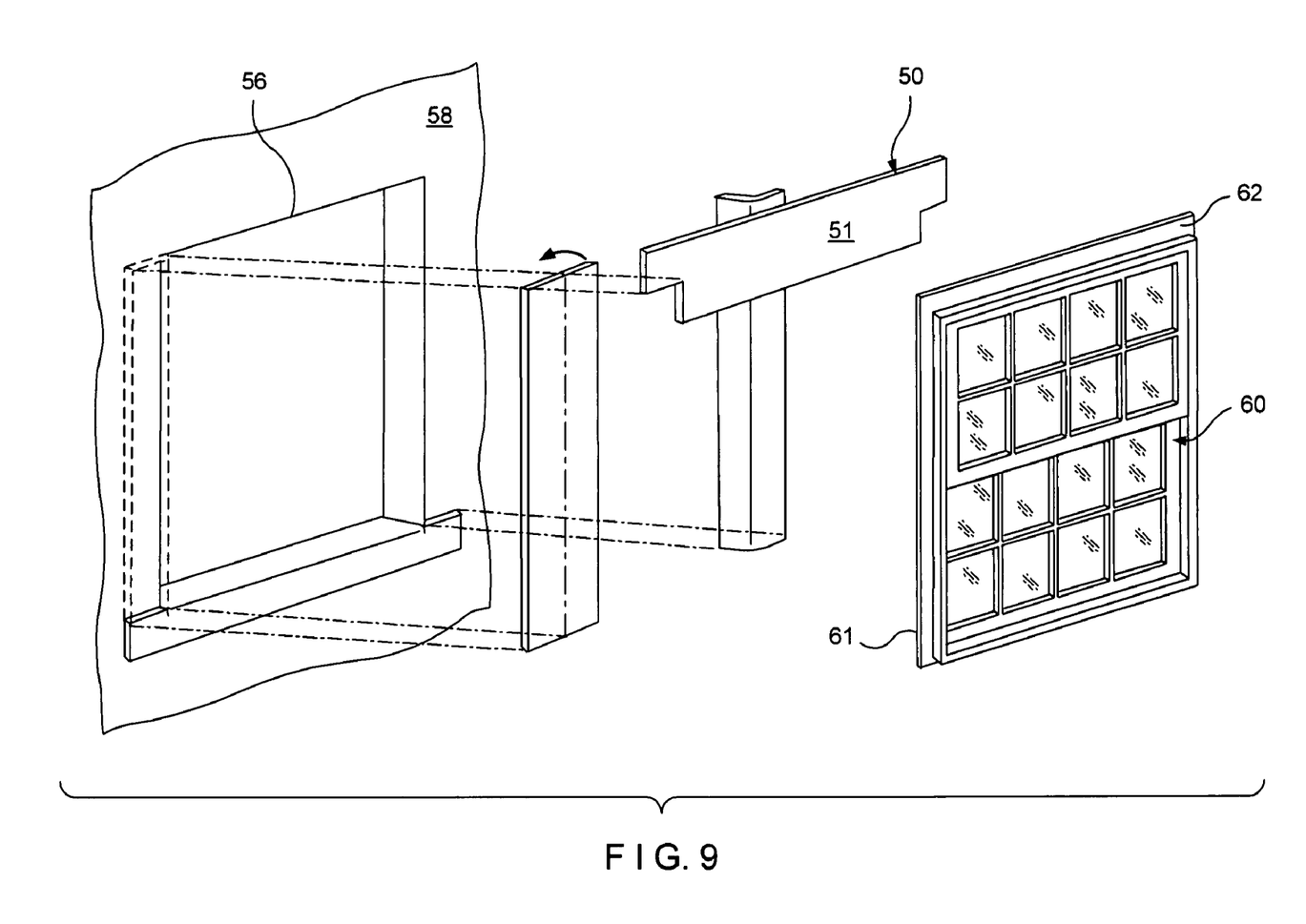
FIG. 9 is a partially exploded view of the rear seal of the first embodiment showing the installation thereof.

For installation, reference is made to FIG. 9. In utilization of the weatherproofing backer 50 of this invention, unlike conventional window flashings, only a few simple steps are required. Before installing windows and doors, the rough openings 56 therefor are checked against the manufacturer's specification. (The rough opening for a door omits the sill and sill jacks of the window opening.) Then, for the broad-tape rear seal tape 51, the window is installed as follows:

a. adhering a rear seal to the interior of the rough opening so as to form a lined sleeve for the inner frame of the window unit. While the sequencing is not significant, this may be completed by the substeps of:
     (1) installing the jamb strips;
     (2) abutting the sill strip against the jamb strips;
     (3) abutting the header strip against the jamb strips; and,
   b. adhering the rear seal to the exterior surface of said wall and extending the rear seal beyond the outer perimeter of the flange;

The window installation is completed by:
   c. inserting the window unit into the sleeve with the inner frame compressively sealing thereagainst;
   d. securing the flange of the window unit to the wall with attaching hardware, the attaching hardware passing through and sealing against the adhesive layer of the rear seal;
   e. adjusting securement of step d. to resiliently deform the rear seal with the surface plane of the flange being intermediate the plane of the wall surface and of the uncompressed rear seal extending beyond the flange; and,
   f. adhering the front seal to the outer face of the window flange and outwardly across weatherproofing-membrane-backer portion and with the rear adhesive layer adhering to the wall surface or substrate;
   g. at the time of installing the weatherproofing membrane, removing the release sheet and adhering the weatherproofing membrane to the front adhesive layer of the front seal.

It is noted that the front seal strips also abut one with the other. It is good practice in installing the front seal of the first embodiment not to have the abutting seams of the rear seal and of the front seal in alignment with each other. Another installation note is that the weatherproofing system hereof is somewhat forgiving of ill-prepared rough openings. With over specification openings, the header and the jambs can be padded with an extra layer of lining to bring the opening within specification.

In the manner just described, the weatherproofing system 50 seals against the inner frame and the underside of the flange of the window unit and bridges between such seals and the weatherproofing membrane.

In utilizing the sheet-like form of the rear seal 151 of weatherproofing system 150, the above method is adapted by first adhering the backer to the wall surface so that the rough opening is approximately centered within the sheet. The rear seal 151 extension beyond the window flange area being sufficiently less than the front seal width so as to allow for an appropriate front-seal-to-substrate seal area when the front seal is installed over the flange (see front seal description, above). Then, lining the rough opening by the substeps of:

(1) cutting the rear seal disposed over the rough opening to form flaps for lining the rough opening; and,
   (2) trimming the excess rear seal extending beyond the interior surface of the wall.

The above-described weatherproofing system provides a self-adhering window and door wrap and an expansion joint therefor. A simplification of window installation is provided hereby eliminating the need for the many after-flashing procedures, including adding loose insulation to the opening, and using beads of caulking to seal the cavity.

Other variations of the embodiments shown can be utilized without departing from the spirit of the claims which follow. For example while the adhesive in the above embodiments is shown as a clear, pressure-activated adhesive, other adhesive systems, such as butylated adhesive, bituminous adhesive, hot-melt adhesive, water-based acrylic adhesive, and mixtures thereof may be used without departing from the spirit of the above invention. Also, both the front and the rear seal are shown as unitary structures, however the device and method of use thereof extend to separate applications of adhesive and foam materials, including such applications as double-sided and single-sided tapes and field-applied adhesives.

What is claimed is:

1. A weatherproofing system for use in construction of a building with a wall with a rough opening there through for receiving a window unit having a frame with a flange thereabout, an exterior surface of said wall being a substrate for a weatherproofing membrane and said flanged window unit, said weatherproofing system comprising, in combination:

a rear seal having a foam web with two major surfaces, said foam web being self-setting with a predetermined recovery rate, said foam web selected from a group consisting of an open cell structure, a closed cell structure, and a structure of open and closed cells, said rear seal disposed in said rough opening to compressively fill, upon emplacement of said flanged window thereon, the cavity between said flanged window unit and said rough opening precluding the entry of water, water vapor and air, said rear seal, in turn comprising:

a pressure-activated adhesive layer disposed on one of said two major surfaces of said foam web, said adhesive layer having sufficient tack to, upon pressure activation to durably adhere said rear seal to said substrate and form a sealed bridge between said window flange and said weatherproofing membrane;

a front seal having two major surfaces, said front seal selected from a group consisting of a foam web, a polymeric tape, and a metal foil, said front seal, in turn comprising:

a flange cover portion adapted, upon installation, to cover the exterior surface of said flange of said window unit;

a rear seal cover portion adjacent to and contiguous with said flange cover portion, upon installation, covering the rear seal portion extending beyond said flange of said window unit;

an extension portion adjacent to and contiguous with said rear seal cover portion, adapted, upon installation, to be disposed on said substrate;

a rear adhesive layer disposed on one of said two major surfaces of said front seal, said adhesive layer having sufficient tack to, upon pressure activation to durably adhere said front seal to said flange, to said rear seal and to said substrate; and, a front adhesive layer disposed on one of said two major surfaces of said front seal, said front adhesive layer being opposite said rear adhesive layer said front adhesive layer, upon pressure activation to durably adhere said front seal to said weatherproofing membrane.

2. A weatherproofing system as described in claim 1, wherein said rear seal further comprises:

a liner portion of said foam web adapted, upon installation, to line the interior of said rough opening;

a flange seal portion of said foam web, said flange seal portion adjacent to and contiguous with said liner portion, said flange seal portion adapted, upon installation, to compressively seal against the underside of said flange of said window unit, to be resiliently deformed thereby, and to be disposed on said substrate;

an outer peripheral portion of said foam web, said outer peripheral portion adjacent to and contiguous with said flange seal portion adapted, upon installation, to be disposed on said substrate; and, a pressure-activated adhesive layer disposed on one of said two major surfaces of said foam liner portion, of said foam seal portion, and of said foam outer peripheral portion, said adhesive layer having sufficient tack to, upon pressure activation to respectively adhere said liner portion to said interior of said rough opening and said flange seal portion and said outer peripheral portion to said substrate.

3. A weatherproofing system as described in claim 2 wherein said window unit further comprises an inner frame and wherein said liner portion has a predetermined thickness and adapts said window unit to upon installation, to compressively seal said inner frame against said liner portion thereby obviating the adding of additional insulation.

4. A weatherproofing system as described in claim 3 wherein said foam web forming said flange seal portion is self-setting and molds to said flange of said window unit, said foam web having sufficient memory upon thermal contraction to maintain full contact with said flange of said window unit and having sufficient resilience upon thermal expansion to maintain full contact with said flange of said window unit.

5. A weatherproofing system as described in claim 4 wherein said foam web maintains the sealed condition over a temperature range of −70° F. to +180° F.

6. A weatherproofing system as described in claim 4 wherein said flange of said window unit is securable to said substrate by attaching hardware extending through said rear seal and into said substrate, said adhesive layer of said rear seal being adapted to seal said attaching hardware and thereby maintain the integrity of the seal against water and air penetration.

7. A weatherproofing system as described in claim 6 wherein said foam web has a predetermined compression set adapting said foam web to mold to the exterior configuration of said flanges of said window unit.

8. A weatherproofing system as described in claim 6 wherein said foam web of said rear seal further comprises a self-skinned layer disposed on said major surface of said foam web opposite said adhesive layer, said self-skinned layer releasably adherable to said adhesive layer enabling said rear seal to be rolled upon without a release sheet therebetween.

9. A weatherproofing system as described in claim 1 wherein said foam web is selected having a compression set of 20 to 80 percent at 18 psi.

10. A weatherproofing system as described in claim 1 further comprising:

a release sheet adhered to said front adhesive layer of said front seal, said release sheet being removable prior to mounting of said weatherproofing membrane.

11. A weatherproofing system as described in claim 1 wherein said pressure-activated adhesive layer is an adhesive selected from the group consisting of a hot melt adhesive, a butyl-based adhesive, an acrylic adhesive, a water-based adhesive, and a bituminous adhesive.

12. A weatherproofing system as described in claim 11 wherein said pressure-activated adhesive layer is a clear hot melt adhesive.

13. A weatherproofing system as described in claim 12 wherein said foam web further comprises a fire retardant additive.

14. A weatherproofing system as described in claim 13 wherein the presence therein of a predetermined quantity of said fire retardant additive forms a self-extinguishing rated foam web;

whereby said weatherproofing system meets standards for avoidance of smoke generation and flame acceleration.

* * * * *

UNITED STATES PATENT AND TRADEMARK OFFICE
CERTIFICATE OF CORRECTION

PATENT NO. : 7,874,121 B1
APPLICATION NO. : 11/328355
DATED : January 25, 2011
INVENTOR(S) : Ronald P. Hohmann, Jr.

Page 1 of 1

It is certified that error appears in the above-identified patent and that said Letters Patent is hereby corrected as shown below:

On the Title Page, Item 63, Related U.S. Application Data:

"Continuation-in-part of application No. 11/318,761, filed on Oct. 27, 2005, now Pat. No. 7,754,304."
should read
--Continuation-in-part of application No. 11/318,761, filed on Dec. 27, 2005, now Pat. No. 7,754,304.--

In the Claims

On Column 12, Claim 1, Line 30:

"building with a wall with a rough opening there through for"
should read
--building with a wall with a rough opening therethrough for--

On Column 12, Claim 1, Line 38:

"of an open cell structure, a dosed cell structure, and a"
should read
--of an open cell structure, a closed cell structure, and a--

Signed and Sealed this
Thirtieth Day of July, 2013

Teresa Stanek Rea
*Acting Director of the United States Patent and Trademark Office*